H. MÜLLER.
EMERY CLOTH HOLDER.
APPLICATION FILED MAY 2, 1918.
1,274,928. Patented Aug. 6, 1918.
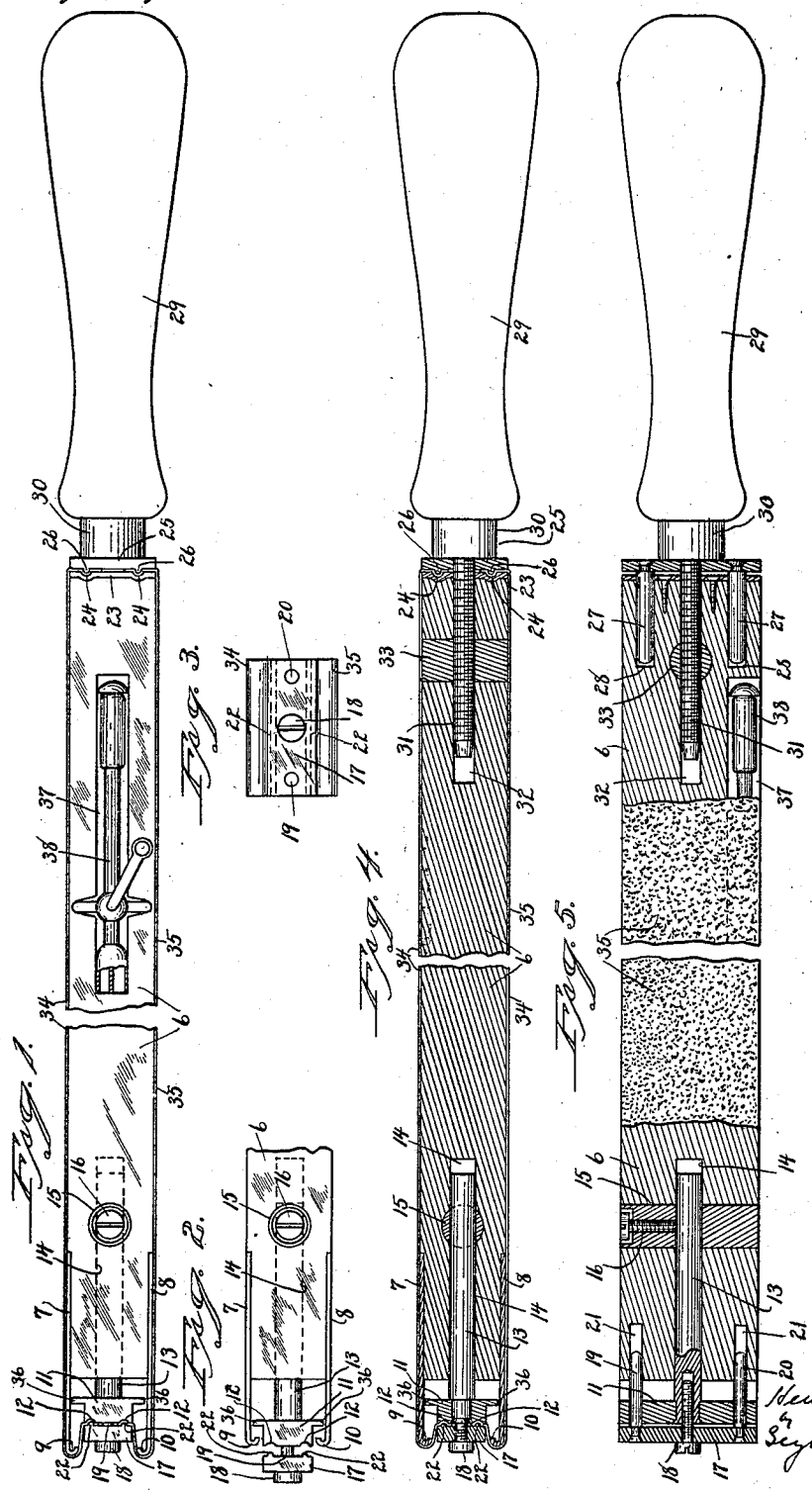
Inventor
Henry Müller
by
Seymour Earle
Atty.

UNITED STATES PATENT OFFICE.

HENRY MÜLLER, OF WATERBURY, CONNECTICUT.

EMERY-CLOTH HOLDER.

1,274,928. Specification of Letters Patent. Patented Aug. 6, 1918.

Application filed May 2, 1918. Serial No. 232,154.

*To all whom it may concern:*

Be it known that I, HENRY MÜLLER, a citizen of the United States, residing at Waterbury, in the county of New Haven and State of Connecticut, have invented a new and useful Improvement in Emery-Cloth Holders; and I do hereby declare the following, when taken in connection with the accompanying drawings and the characters of reference marked thereon, to be a full, clear, and exact description of the same, and which said drawings constitute part of this application, and represent, in—

Figure 1 a side view of an emery cloth holder constructed in accordance with my invention.

Fig. 2 a side view of the outer end of the body with the strips of emery cloth removed.

Fig. 3 an outer end view.

Fig. 4 a vertical sectional view.

Fig. 5 a broken transverse sectional view.

This invention relates to an improvement in emery cloth holders, and particularly to holders which are adapted to hold strips of emery cloth, the device being adapted to be used in the same way as a file for smoothing or polishing surfaces, or as a device for sharpening knives and other implements, the object of the invention being to produce a device by which the emery cloth is firmly supported not only at its ends but throughout its entire length, with convenient means for placing the necessary tension on the cloth to maintain it in a firm position on the holder; and the invention consists in an emery cloth holder having certain details of construction and combinations of parts as will be hereinafter described and particularly recited in the claims.

In carrying out my invention, I employ a body 6 of any suitable dimensions preferably formed from wood with flat surfaces. Attached to opposite faces of the body are plates 7 and 8 the outer faces of which are flush with the faces of the body and these plates project beyond the end of the body, and the ends are rolled or curved to form rounded lips 9 and 10 for the purpose as will hereinafter appear. Between the projecting ends of the plates 7 and 8 is a block 11 formed in its outer face with grooves 12 the block being mounted on a stem 13 which extends into a hole 14 formed for it in the end of the body, this hole extending through a metal bushing 15 one end of which is bored and tapped to receive a screw 16 which may be turned to a bearing against the stem 14. Arranged parallel with the block 11 is a clamping plate 17 adapted to be connected with the block by a screw 18, and provided with inwardly projecting pins 19 and 20, which extend through the block and into holes 21 formed for them in the end of the body. The inner face of the clamping plate is formed with ribs 22 registering with the grooves 12 formed in the block. To the rear end of the body is attached a bearing plate 23 formed with transverse grooves 24. Co-acting with this bearing plate is a rear clamping-plate 25 the inner face of which is formed with ribs 26 registering with the grooves 24 in the bearing plate. This rear clamping plate is provided with guide pins 27 which extend through the bearing plate 23 into sockets 28 formed for them in the rear end of the body. The handle 29 is provided with a ferrule 30 and with a screw threaded stem 31 which extends through the plates 25 and 23 into a centrally arranged longitudinal opening 32 formed for it in the rear end of the body and passes through a transversely arranged bushing 33 which forms a nut for the screw stem. Strips 34 and 35 of emery cloth or other suitable material of the required length and width are placed on opposite sides of the body, the rear ends being turned inward between the plates 23 and 25 between which they are firmly held by turning the handle 29 inward so as to crowd these plates together, the ends of the strips being held by the co-action of the ribs 26 and the grooves 24. The screw 16 is turned outward so as to release the stem 13 and allow the block 12 to be moved outward, the block being provided on opposite sides with flanges 36 which will engage with the rounded ends 9 and 10 of the plates 7 and 8, and the clamping-plate 17 is separated from the block. The outer ends of the strips are then turned inward over the ends of the plates 7 and 8, and between the clamping-plate and block, where they are secured by turning the screw 18 inward so as to force the clamping plate 17 against the block 11, thus firmly holding the outer ends of the strips. The block is then forced inward so as to place the required tension on the strips which are turned over the rounded edges of the plates, and when the desired tension is attained, the screw 16 is turned inward to clamp the stem and thus hold the block in its inward position. The strips are therefore held under tension and rest upon the smooth surface of the faces of the block which form a support for them and permit the device to be used as a file or in any desired way, the body providing a backing for the strips throughout their entire length. Preferably, and as shown in Fig. 1 of the drawings, a recess 37 will be formed in one side of the body to receive a screw driver 38 by which the clamping screws may be turned.

I claim:—

1. An emery cloth holder comprising a body having flat faces, plates secured to opposite sides of the body and projecting beyond the outer end thereof, a clamping block arranged between the projecting ends of the plates, means for connecting the ends of flexible strips to the block, means for locking the block in the body, and means for attaching the opposite ends of flexible strips to the rear end of the body.

2. An emery cloth holder comprising a body having flat faces, plates secured to opposite faces of the body, said plates projecting beyond the outer end of the body, a block arranged between said plates and provided with a stem extending into the end of the body, means for locking the stem with the body, a clamping-plate co-acting with said block and adapted to hold the ends of strips of flexible material between them, and means for connecting the other ends of the strips with the handle end of the device.

3. An emery cloth holder comprising a body having flat faces, plates secured to the said faces and projecting beyond the outer end of the body, a block located between said plates provided with a stem extending into said body, a clamping-plate co-acting with said block and adapted to hold the ends of strips of flexible material between them, a bearing-plate secured to the inner end of the body, a rear clamping-plate co-acting with said bearing-plate, and a handle formed with a screw stem extending through the said plates and into the body and adapted to crowd the rear clamping-plate against the rear bearing-plate and hold the ends of the strip of flexible material between them.

4. An emery cloth holder comprising a body having flat faces, plates secured to said faces and projecting beyond the outer ends of the body, a block located between said plates and formed with a stem extending into the said body, a plate co-acting with the said block and formed with guide pins extending through the block into the said body, a bearing plate secured to the rear end of the body, a rear clamping-plate co-acting with said bearing plate and formed with guide pins extending through the bearing plate into the body, a handle bearing on said rear clamping plate and provided with a stem extending through said rear clamping-plate and bearing-plate into the body, and a transverse bushing with which said screw threaded stem engages.

In testimony whereof, I have signed this specification in the presence of two subscribing witnesses.

HENRY MÜLLER.

Witnesses:
DORIS H. WILSON,
GEORGE A. BARONIAN.

Copies of this patent may be obtained for five cents each, by addressing the "Commissioner of Patents, Washington, D. C."